United States Patent
McRae

(10) Patent No.: US 9,389,692 B2
(45) Date of Patent: Jul. 12, 2016

(54) DISPLAY SCREEN ORIENTATION LOCK REMOVED BY THE ANGLE BETWEEN THE DISPLAY SCREEN AND THE KEYBOARD OR BOTTOM OF THE COMPUTING DEVICE EXCEEDING A PREDETERMINED ANGLE

(71) Applicant: Vizio Inc, Irvine, CA (US)

(72) Inventor: Matthew Blake McRae, Irvine, CA (US)

(73) Assignee: Vizio, Inc, Irvine, CA (US)

(*) Notice: Subject to any disclaimer, the term of this patent is extended or adjusted under 35 U.S.C. 154(b) by 224 days.

(21) Appl. No.: 14/096,321

(22) Filed: Dec. 4, 2013

(65) Prior Publication Data
US 2015/0154737 A1 Jun. 4, 2015

(51) Int. Cl.
G09G 5/12 (2006.01)
G06F 3/01 (2006.01)
G06F 1/16 (2006.01)

(52) U.S. Cl.
CPC ............. *G06F 3/017* (2013.01); *G06F 1/1679* (2013.01); *G06F 1/1681* (2013.01)

(58) Field of Classification Search
CPC .............................. G06F 3/017; G06F 3/04845
USPC ......................................................... 345/652
See application file for complete search history.

(56) References Cited

U.S. PATENT DOCUMENTS

| | | | |
|---|---|---|---|
| 8,217,964 B2 * | 7/2012 | Laine .................... | G06F 1/1626 345/659 |
| 8,315,047 B2 | 11/2012 | Tsuchihashi et al. | |
| 8,970,629 B2 * | 3/2015 | Kim ..................... | G06F 3/04815 345/173 |
| 2008/0129666 A1 * | 6/2008 | Shimotono ............. | G06F 1/162 345/87 |
| 2009/0066728 A1 * | 3/2009 | Ording .................. | G06F 3/0485 345/652 |
| 2009/0296331 A1 * | 12/2009 | Choy .................... | G06F 1/1616 361/679.09 |
| 2009/0298550 A1 * | 12/2009 | Kang ..................... | G06F 3/147 455/566 |
| 2010/0026720 A1 * | 2/2010 | Hotta .................... | G06F 1/1616 345/652 |
| 2010/0124735 A1 * | 5/2010 | Chen ..................... | G06F 3/0484 434/284 |
| 2010/0171693 A1 * | 7/2010 | Tamura .................. | G09G 5/003 345/156 |
| 2012/0001943 A1 * | 1/2012 | Ishidera ................ | G06F 3/0346 345/659 |
| 2012/0162263 A1 * | 6/2012 | Griffin .................. | G06F 1/1624 345/652 |
| 2012/0229371 A1 * | 9/2012 | Sip ........................ | G09G 3/20 345/156 |
| 2013/0038634 A1 * | 2/2013 | Yamada ................. | G09G 5/00 345/649 |
| 2013/0230209 A1 * | 9/2013 | Hashimoto ............. | G06T 9/00 382/103 |
| 2014/0071147 A1 * | 3/2014 | Trethewey ............. | G06T 7/004 345/581 |

* cited by examiner

*Primary Examiner* — Javid A Amini
(74) *Attorney, Agent, or Firm* — Law Office of Scott C Harris, Inc

(57) ABSTRACT

A computer system comprising that has a display screen that displays information from a computing device. An auxiliary device such as a cover or a keyboard is pivotally attached to the display screen. When the angle between the display screen and the auxiliary device is a first angle that makes it likely that the device is being used normally, the device is then locked against orientation rotation. The angle between the auxiliary device and the display needs to be brought into an unnatural angle in order to allow automatic orientation rotation.

30 Claims, 6 Drawing Sheets

DISPLAY SCREEN ORIENTATION LOCK REMOVED BY THE ANGLE BETWEEN THE DISPLAY SCREEN AND THE KEYBOARD OR BOTTOM OF THE COMPUTING DEVICE EXCEEDING A PREDETERMINED ANGLE

BACKGROUND

Until recently, digital display screens were limited to desktop and portable personal computers called laptops. The display screen orientation for these types of devices was generally fixed by the manufacturer. Desktop display screens were and are fixed with a mounting base and cannot be places on their short axis such that the screen is in portrait orientation. Laptops generally fall into the same limitation in that the screen axis is fixed because the keyboard and screen orientations are fixed.

The first PDA to appear in the market place did so in 1984. This was a radical device and soon other manufacturers introduced their own PDAs. The Organiser II™ by PSION™ featured a hard keyboard with a small rectangular screen positioned above the keyboard. The Apple™ Newton™ was introduced to the market on Feb. 27, 1998 and featured a soft keyboard and a touch sensitive display screen. The PalmPilot™ introduced on Mar. 10, 1997 became the PDA for the masses. The PalmPilot™ featured a touch screen and a launchable soft keyboard and a reserved area of the display screen for character input via a stylus approximating stylized characters.

None of these PDAs would allow the user to reorient the display screen from portrait to landscape mode. Smart phones such as the Apple™ iPhone™ and PDAs such as the Apple™ iTouch™ were some of the first devices that allowed the user to change screen orientation between portrait and landscape.

Early tablets such as the Apple™ iPad™ allowed the user to lock the screen orientation by using the slide lock on the side of the device. Devices using the Android™ operating system give the users the ability to lock/unlock the screen orientation.

Display screens on laptop and other mobile devices such as tablet computers, PDAs and Cell Phones with soft or hard keyboards would rely on the physical orientation of the computing device to set the orientation of the content being displayed. If a user changes their physical body orientation to laying on their side and orients the display sideways so that landscape mode is preserved relative to the user, then the display screen and the computing device will generally reorient the display to portrait mode relative to gravity. This reorientation would make text on the display screen difficult to read.

The inventors recognize the advantages of having some way to lock the display orientation until the user performs some action to unlock the display screen orientation Apple™ mobile products such as iPad™, iTouch™ and other hand held device as well as Android™ mobile devices allow the user to disable auto-rotation of the display screen imagery by altering a setting in the systems setting menus.

SUMMARY

While a particular display screen orientation can be maintained, it becomes an inconvenience to have to continually enable and disable auto-rotation of the display screen through settings menus.

The inventors recognize advantages from allowing a user to auto lock or unlock the current screen orientation of a portable device.

Embodiments describe a way for the user to lock or unlock the orientation of the display screen for laptops, web books, tables, cell phones and other portable display devices where a rotatable keyboard or cover is attached to the device. This capability gives the user greater flexibility in using such a device.

In a preferred embodiment of the invention, a tablet computer or laptop is disclosed with a physical keyboard attached where the screen folds down against the physical keyboard and fixes the orientation of the display screen in a first orientation such as landscape mode when the screen and keyboard are closed. When the display screen is raised into a viewing position up to some predetermined angle, the screen will remain in landscape mode regardless of the physical orientation of the device. When the display screen is further raised or moved to another predetermined angle, the screen will become unlocked and permit auto rotation about the X,Y axis of the screen allowing the screen to be reoriented.

In this embodiment of the invention, a sensor exists in the screen/keyboard hinge accessible by software to determine the angle of the display screen in relation to the keyboard.

In another embodiment, the angle sensor is replaced with a switch assembly. The state of the switch is changed when the angle between the display screen and the cover or keyboard changes to some predetermined angle at which time the state of the switch is changed. The basic difference between these two embodiments is the first embodiment using an angle sensor provides a fine granularity of the actual angle between the display screen and the attached keyboard or cover. The embodiment that uses the more common switch only provides a granularity with two states.

In another embodiment, the orientation is locked when the display screen/keyboard are closed and the angle between them is zero. When the user next raises the screen away from the keyboard, the screen will become active and the display orientation will be the same as when the display screen/keyboard were closed. For example, if the user had oriented the display screen in a portrait orientation and the angle between the keyboard and the display screen was such that the screen would auto-orient and the user then closed the display screen against the keyboard then placed the device such that the physical display screen would be in a landscape orientation when the display screen was opened, the orientation will be in portrait mode until the angle between the display screen and the keyboard is increased such that the display screen auto-orients to landscape. The normal term used to describe this action is that the orientation is "sticky" once the display screen and keyboard are closed when a given orientation is present.

In another embodiment, a cover containing a cover portion which may act as a back stand for the back of a tablet computer and a keyboard portion which also acts as a cover for the display screen may contain a sensor which can determine the angle of the tablet display screen and the keyboard portion. The angle sensor for the cover/keyboard may communicate the angle between the keyboard/cover and the display screen to the tablet computer through a wired connection such as USB or a wireless connection such as Bluetooth™ also used by the keyboard to communicate with the tablet computer.

In another embodiment, a flip cover that covers the display screen of a cell phone or a PDA may have an angle sensor which is part of a hinge mechanism between the flip cover and the cell phone or PDA. When the flip cover is raised to expose the display screen, the current orientation of the device is preserved until the flip cover exceeds a predetermined angle of the flip cover relative to the front of the display screen at which time the display screen will be free to change its orientation.

In another embodiment, a kickstand may be attached to the back of a tablet and a keyboard may be attached to the front long axis of the tablet. The keyboard may also be used as a cover to protect the display screen surface of the tablet. In this embodiment, the display screen orientation may be fixed at the last time the keyboard/cover was rotated against the display screen. In this embodiment, the last orientation is preserved when the keyboard/cover is rotated away from the display screen. When the keyboard/cover is rotated past a predetermined angle, the display screen orientation will be unlocked.

In another related embodiment, the display screen orientation will be set to landscape when the keyboard/cover is rotated against the display screen and will remain so when the keyboard/cover is first rotated away from the display screen. If the user then rotates the keyboard cover past a predetermined angle the display screen orientation will be unlocked.

Embodiments describe a method, system and apparatus which in one embodiment measures the angle between a computing device display screen and the keyboard or bottom portion of the computing device. The invention consists of an angle measuring component and a software component which monitors the angle of the display screen and the keyboard or bottom portion of the computing device. When the display screen is in a first position against the keyboard or bottom component, the display screen display orientation will be locked in a first display orientation. When the display screen is opened and passes a predetermined angle between the display screen and the keyboard or bottom portion of the computing device the first display orientation lock will be released by the software component after which the display orientation is free to change so a different display orientation. In another embodiment, the position of the display device is determined by a switch which is in one state (locked) or a second state (unlocked) determined by the position of the display device. When the switch is in the locked state the orientation of the display device is locked to a predetermined orientation such as landscape or portrait. When the position of the display device is moved to where the switch changes state, the orientation of the display device will be unlocked and the orientation of the display device will change as the display device is tilted or rotated.

BRIEF DESCRIPTION OF THE DRAWINGS in the drawings.

DETAILED DESCRIPTION

Figure 1A:
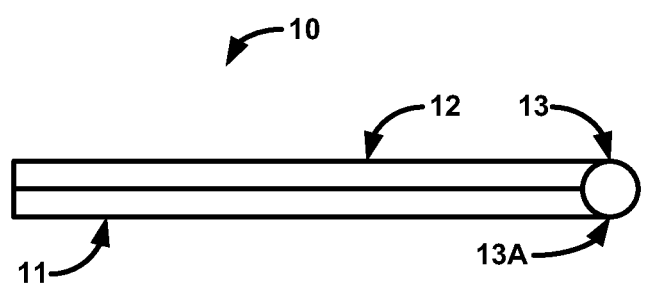
FIG. 1A is a depiction of a side view of a laptop where the keyboard and display screen are position against each other.
Figure 2B:
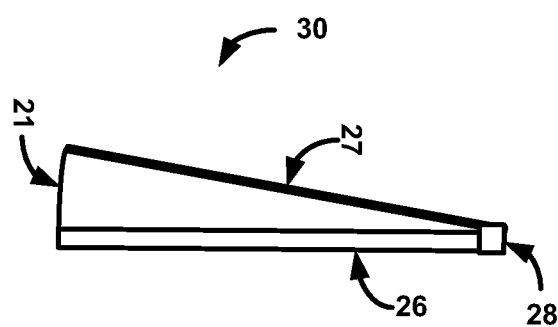
FIG. 2B is a depiction of a cell phone or PDA with a flip cover partially open.
Figure 2A:
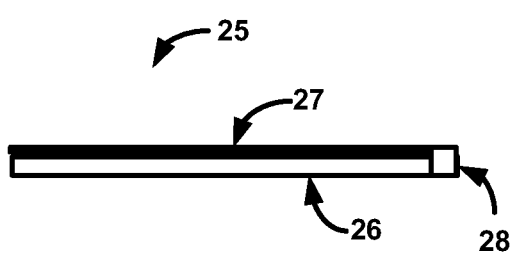
FIG. 2A is a depiction of a cell phone or PDA with a flip cover closed
Figure 3A:
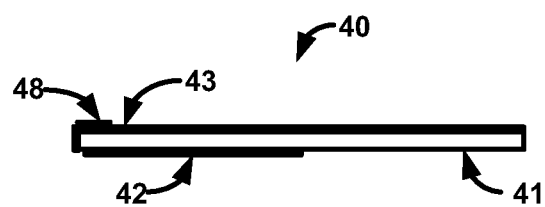
FIG. 3A is a depiction of a tablet computer with a back kickstand and keyboard/cover closed

Now referencing FIGS. 1A, 2A and 3A. In these depictions position sensors are integrated into a hinge assembly device 13 (FIG. 1A), 28 (FIG. 2A) or 48 (FIG. 3A). The sensor assemblies 13 and 28 sense the angle between display 12 and auxiliary device 11 (FIGS. 1A and 2A) and between tablet computer 41 and auxiliary device 43(figure 3A) through use of the sensors. In embodiments, the auxiliary device may be a keyboard which is used to interact with the computer that drives the output to the display screen, or can be a cover for the display screen, or any other auxiliary device that is hinged to the display screen. Sensor assemblies 13, 28 and 48 sense the angle between the front of a display and the keyboard or cover. The sensors may be a type of angle sensors such as a type referred to as gray code encoded wheels, cylinders or disks. These types of position encoders can generally provide a fine granularity in the angles being measured and reported. Use of another sensor type is also possible where the sensor only detects and reports two states. This type of sensor may be a Hall Effect sensor which detects the presence of a magnetic field close to the sensing element. Another type of sensor that only detects and reports two states is a mechanical switch such as a micro switch. This type of sensor may have a cam that rotates with the lobe of the can depressing the micro switch when the display or cover is rotated to a predetermined position. Another type of two position reporting sensor that may be used is an optical sensor. This type of sensor contains a light detecting element under a moving shell with a hole or slot that emits light onto the light detecting element when the hole or slot moves into position over the light detecting element. Another type of sensor that only detects and reports two states is a mechanical switch such as a micro switch. This type of sensor may have a cam that rotates with the lobe of the can depressing the micro switch when the display or cover is rotated to a predetermined position. Another type of two position reporting sensor that may be used is an optical sensor. This type of sensor contains a light detecting element under a moving shell with a hole or slot that emits light onto the light detecting element when the hole or slot moves into position over the light detecting element.

In one embodiment, the first angle range where the computer is locked against rotation is an angle of normal operation of said computer when using the auxiliary device. The second angle is an angle beyond that of normal operation of the computer Now referencing FIG. 4 where screen state 58 is a flag or variable that has two possible states, those being locked or unlocked. In this depiction, process block poll position sensor 52 either interrogates and receives positional data from position sensor 13, 28 or 48 or receives positional data from a driver that continually reads sensors 13, 28 or 48 and passes the positional data onto process block poll position sensor 52.

In this depiction, process block poll position sensor 52 receives position data from position sensor 13, 28 or 48. Process block poll position sensor 52 passes the position data to decision block sensor=lock? 57 which determines from the position data if the relative angle between the body of the computing device (FIG. 1A 11, FIG. 2a 26 or FIG. 3a 41) and the keyboard or cover (FIG. 1A 12, FIG. 2a 27 or FIG. 3a 43)

is within the bounds of locked arc 21 or unlocked arc 14. If the angle is within the bounds of locked arc 21, control will flow through the YES exit to decision block screen state=unlock? 53. If the angle is within the bounds of unlocked arc 14, control will flow through the NO exit to decision block screen state=locked? 55.

If control flowed from decision block sensor=lock? 57 to decision block screen state=unlock? 53 and if screen state 58=locked, control will flow through the NO exit and onto process block poll position sensor 52. This sequence of logic flow occurs when the computer device cover is positioned within the bounds of the locked arc 21. The orientation of the display screen image will be locked and the user can rotate the computing device about any of its axes and the display screen image will not change its orientation.

If control flowed from decision block sensor=lock? 57 to decision block screen state=unlock? 53 and if screen state 58=unlocked, control will flow through the YES exit and onto process block lock screen orientation 54 where screen state 58 is set to locked then control flows to process block poll position sensor 52. This logic sequence occurs when the computer device cover is positioned within the bounds of the locked arc 21. The orientation of the display screen image was unlocked. This occurs when the user had moved the screen display such that the angle between the screen display and the keyboard cover was within the bounds of the unlocked arc 14. The user then rotated the computing device until the screen display image reoriented itself and the user returned the screen display to an angle such that it fell within the bounds of the locked arc 21.

If decision block sensor=locked? 57 determined from the position data that the angle is within the bounds of unlocked arc 14, control will flow through the NO exit to decision block screen state=lock? 5. If screen state 58=unlocked, control will flow through the NO exit and onto process block poll position sensor 52. If decision block screen state=lock? 55 determines that screen state 58 is locked, then control will flow through the YES exit and onto process block unlock screen orientation 56 where screen state 58 will be set to unlocked after which control will flow to process block poll position sensor 52.

This logic sequence occurs when the computer device screen display is positioned within the bounds of the locked arc 21 and the user then moves the screen display such that the angle between the screen display and the keyboard/cover is within the bounds of the unlocked arc 14. When this happens, screen state 58 was previously locked. This sequence sets screen state 58 to unlocked allowing the user to rotate the computing device about its axis to reorient the display screen image.

Figure 1B:
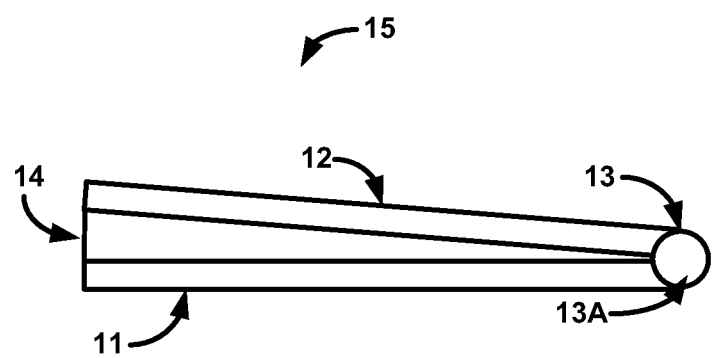
FIG. 1B is a depiction of a side view of a laptop where the keyboard and display screen are positioned slightly apart.
Figure 1C:
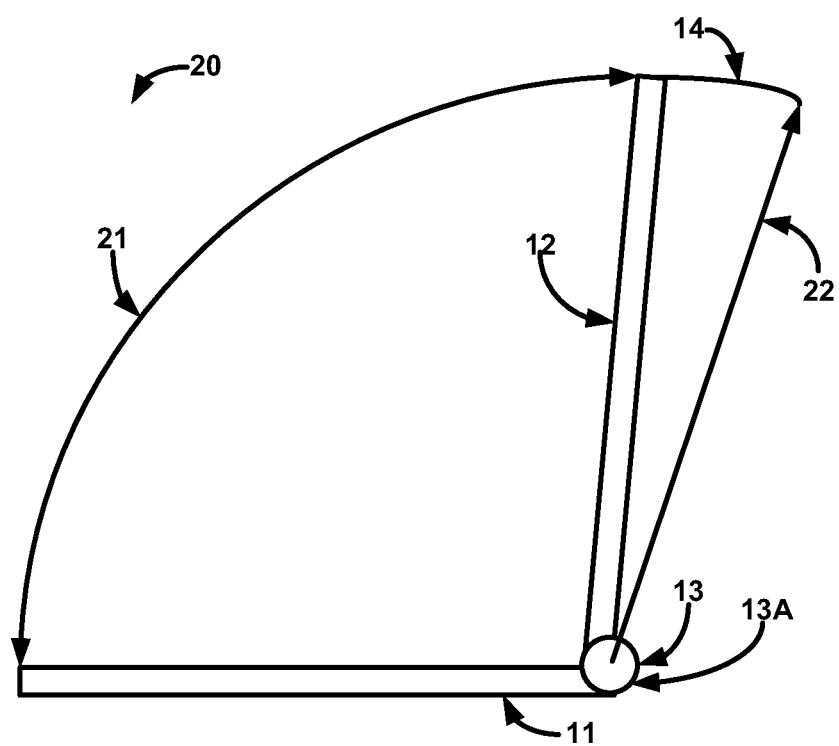
FIG. 1C is a depiction of a side view of a laptop where the keyboard and display screen are shown positioned at a nominal angle with the max angle is shown.
Figure 4:
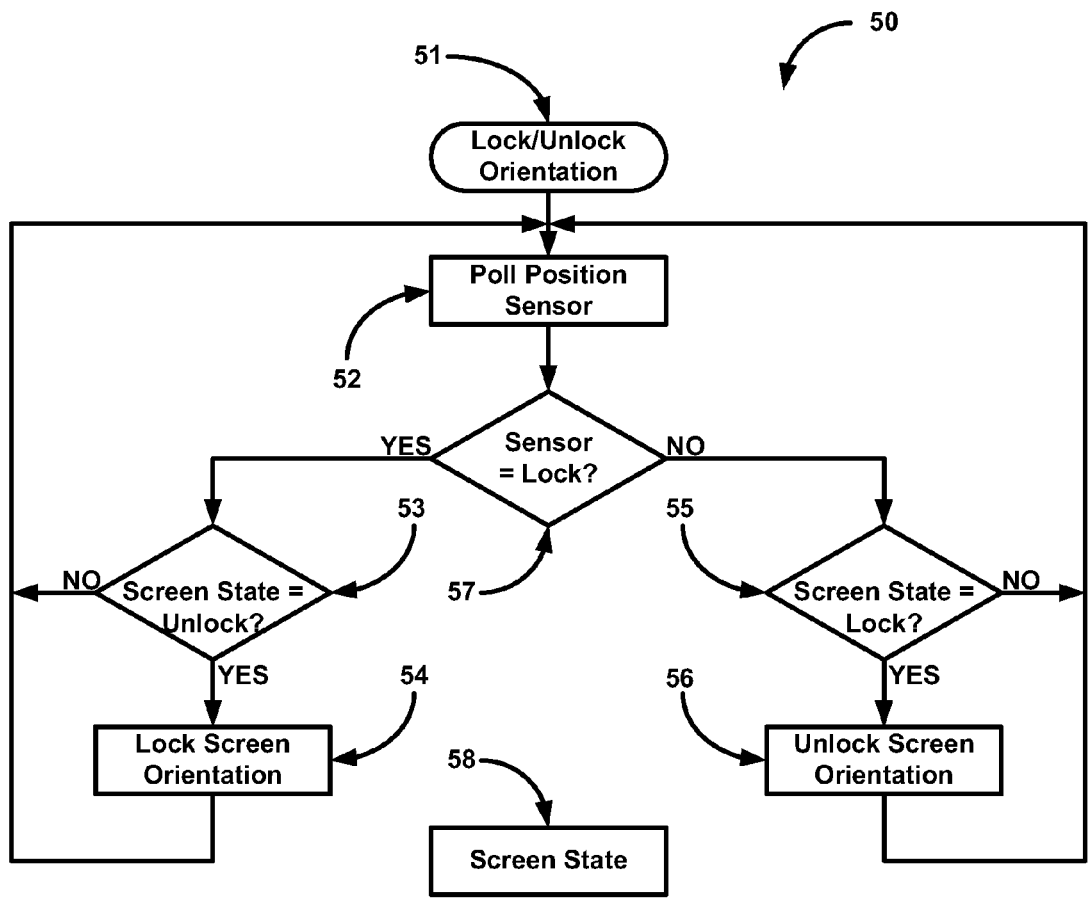
FIG. 4 is a flowchart schematic depicting determination of cover status as to closed or open and locked or unlocked where the determination is made via an angle sensor.

Now referencing figure 1A where 10 depicts a laptop/web book or other mobile type personal computer. In this depiction, the base of the mobile computer depicted in 10 shows a keyboard 11 and a display 12. In this depiction, display 12 is shown in a closed position and is physically parallel to keyboard 11. Hinge assembly 13 is physically attached to both keyboard 11 and display 12. In this depiction, hinge assembly 13 also houses angle sensor 13A. In another embodiment, angle sensor 13A may be housed within keyboard 11 or display 12. Now referencing FIG. 1B where 15 depicts the same mobile computer as depicted in figure 1A with the exception that the mobile computer depicted in FIG. 1B is depicted as partially open. FIG. 1C depicts the mobile computer in a normally open position. In this depiction, locked arc 21 is the normally locked position for using the depicted laptop. This is the arc between the keyboard and the display when the computer is being normally used. If the user further moves display 12 such that the angle between keyboard 11 and display 12 is within the bounds of unlock arc 14, angle sensor 13A housed in hinge assembly 13 will detect that display screen 12 has moved into the bounds of unlock arc 14. This unlock arc is an angle that is not a normal angle for use of the computer, as seen in FIG. 1C, this is not normal angle at which the computer would be used relative to the keyboard. At this time, the operation of FIG. 4 will receive information that the angle sensor has detected an unlock event at a greater angle than the normally locked position (as being within the bounds of locked arc 21). FIG. 4 normally polls the position sensor at intervals. As an alternative embodiment, angle sensor 13A can send a signal through a driver program as a real time event, to the processor that is running the routine of FIG. 4.

Figure 2C:
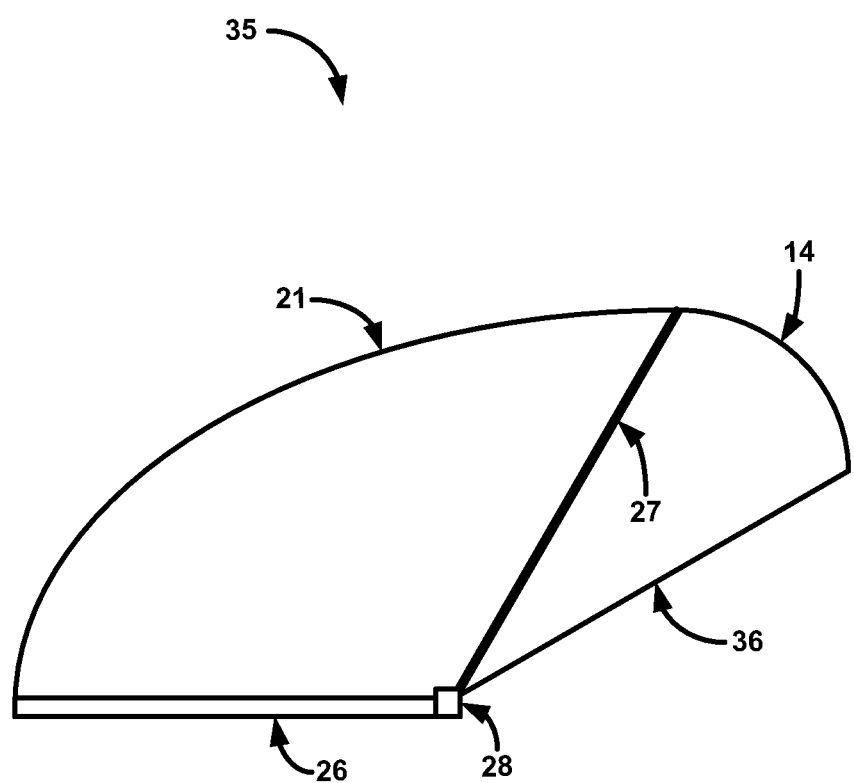
FIG. 2C is a depiction of a cell phone or PDA with a flip cover are shown positioned at a nominal angle with the max angle is shown.

Now referencing FIG. 2A where 25 depicts a handheld mobile device such as a cell phone or a PDA which has a closeable cover. In this depiction, cell phone/PDA 26 has a cover 27 connected to cell phone/PDA 26 by hinge assembly 28. Hinge assembly 28 may also contain angle sensor 28A (not shown for clarity). In the normal "not used state", cover 27 is positioned parallel with cell phone/PDA 26. Now referencing FIG. 2B where 30 depicts cell phone/PDA 26 with cover 27 partially open and within the bounds of locked arc 21. With cover 27 open to the angle shown the display screen is still not usable and remains in its locked state. Now referencing FIG. 2C where 35 depicts cover 27 open to the extent of locked arc 21. With cover 27 open to the extent of locked arc 21 the display screen of cell phone 26 is usable. If the user opens cover 27 to the extent of unlocked arc 14 at angle line 36, angle sensor 28 will notify process block poll position sensor 52 (FIG. 4) of the event.

Now referencing FIG. 3A where 45 depicts a tablet computer where tablet computer 41 is equipped with a back stand more commonly referred to as a kick stand 42. Kickstand 42 allows tablet computer 45 to be positioned such that the user need not hold tablet computer 45 to read or look at the display screen. In this depiction, tablet computer 45 also has a cover/keyboard 43 which when in a closed position as shown in FIG. 3A, protects the display screen of table computer 41. Cover/Keyboard 43 also contains angle sensor 48. Angle sensor measures the angle between the surface of cover/keyboard 43 and the surface of table computer 41. Cover/keyboard 43 and angle sensor 48 communicates with table computer 41 through either a wired or wireless communications link. Wired communications links for these types of keyboards is generally USB™ and Bluetooth™ for wireless communications links.

Figure 3B:
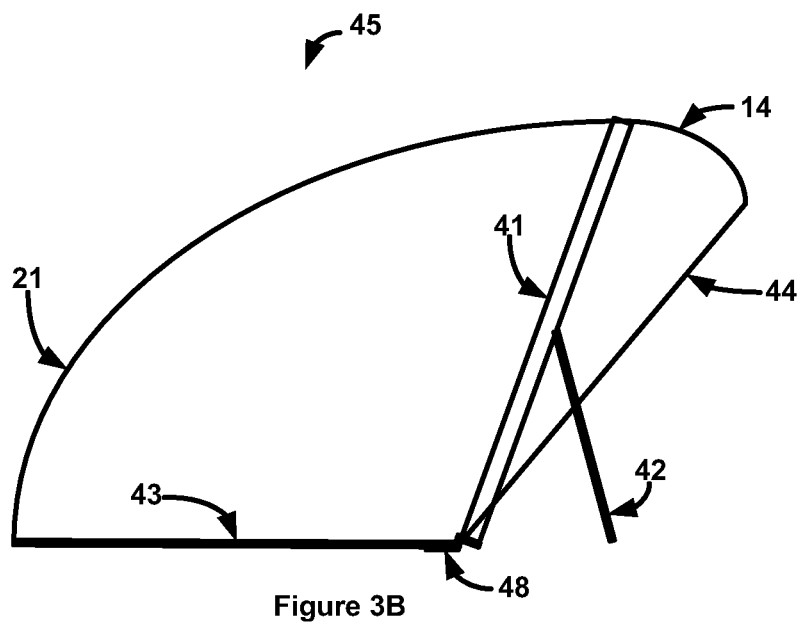
FIG. 3B is a depiction of a tablet computer with a back kickstand and keyboard/cover shown positioned at a nominal angle with the max angle is shown.

Now referencing FIG. 3B where 45 depicts tablet computer 41 resting on its kick stand 42 with cover/keyboard 43 positioned for entering data. In this position, tablet computer 41 will have its display screen locked in the current orientation which would generally be landscape. Note that locked arc 21 is the normal open angle of cover/keyboard 43 and table computer 41. If tablet computer 41 is angled back to the extent of locked arc 14 and angle line 44, angle sensor 48 will notify tablet computer 41 via the wired or wireless communications link of the unlock event. Process block poll position sensor 52 (FIG. 4) will receive the event resulting in screen state 58 being set to unlock allowing the user to rotate computer 41 about its axis and reorienting the display screen image. When the user repositions computer 41 such that the angle between cover/keyboard 43 falls within the bounds of locked ark 21 position sensor 48 will again notify tablet computer 41 via the wired or wireless communications link of the lock event. Process block poll position sensor 52 (FIG. 4) will receive the event resulting in screen state 58 being set to locked allowing the user to rotate computer 41 about its axis without reorienting the display screen image.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of light modulators and light emitters.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11 . Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system comprising:
   a display screen;
   a computing device, that produces output to be displayed on the display screen;
   an auxiliary device for the computing device, attached to the display screen, and pivotable relative to the display screen; and
   an angle sensor, sensing an angle between the auxiliary device and the display screen, and producing a signal indicative of said angle and coupling said signal to said computing device,
   wherein said computing device detects a first angle and locks an orientation that is displayed on the display screen to a locked orientation based on detecting said first angle between said computing device and said auxiliary device, where said first angle is an angle which would normally exist between said computing device and said auxiliary device when said auxiliary device was being used by a user to enter data onto the computing device, and said computing device detects a second angle between said computing device and said auxiliary device, where said second angle is an angle that would normally not exist when the user was entering data into said auxiliary device on said computer, and unlocks the orientation that is displayed on the display screen to an unlocked orientation based on detecting said second angle,
   where in said locked orientation, a display on said display screen cannot be rotated, and in said unlocked orientation, the display on said display screen can be rotated.

2. The computer system as in claim 1, further comprising an orientation sensor, sensing an orientation of the display screen, and automatically changing an orientation displayed on the display screen, only when said computing device detects said second angle.

3. The computer system as in claim 1, wherein said auxiliary device is a keyboard.

4. The computer system as in claim 1, wherein said auxiliary device is a cover for the display.

5. The computer system as in claim 3, wherein said first angle is an angle of normal operation of said computer when typing on said keyboard, and said second angle is an angle outside that of normal operation of the computer when typing on said keyboard.

6. The computer system as in claim 3, wherein said first angle is an angle of normal operation of the computer when using the keyboard, and said second angle is an angle beyond that of normal operation of the computer using the keyboard.

7. The computer system as in claim 4, wherein said first angle is an angle of normal operation of the computer when the cover is unfolded from the computer, and said second angle is an angle beyond that of normal operation of the computer when the cover is unfolded.

8. The computer system as in claim 1, wherein the angle sensor senses an angle between the display screen and the auxiliary device.

9. The computer system as in claim 1, wherein the angle sensor includes a switch that senses when an angle between display screen and the auxiliary device exceeds a specified amount.

10. The computer system as in claim 1, wherein the angle sensor includes a wireless transmitter that transmits information indicative of the angle to the computer.

11. A computer system comprising:
    a display screen;
    a computing device, that produces output to be displayed on the display screen;
    an auxiliary device, interacting with the display screen, pivotally attached to the display screen; and
    a device orientation sensor, determining an orientation between the auxiliary device and the display screen, and producing a signal indicative of said orientation and coupling said signal to said computing device,
    wherein said computing device detects a first orientation between said computing device and said auxiliary device where said first angle is an angle which would normally exist between said computing device and said auxiliary device when said auxiliary device was being used by a user to enter data onto the computing device, and locks an orientation that is displayed on the display screen to a locked orientation based on detecting said first orientation between said computing device and said auxiliary device,
    and said computing device detects a second orientation between said computing device and said auxiliary device, where said second angle is an angle that would normally not exist when the user was entering data into said auxiliary device on said computer, and unlocks the orientation that is displayed on the display screen to an unlocked orientation based on detecting said second orientation,
    where in said locked orientation, a display on said display screen is locked against rotation.

12. The computer system as in claim 11, further comprising an orientation sensor, sensing an orientation of the display screen, and automatically changing an orientation displayed on the display screen, only when said computing device detects said second orientation.

13. The computer system as in claim 11, wherein said auxiliary device is a keyboard.

14. The computer system as in claim 11, wherein said auxiliary device is a cover for the display.

15. The computer system as in claim 11, wherein said first orientation is an orientation of normal operation of said computer when using said auxiliary device, and said second orientation is an orientation beyond that of normal operation of the computer.

16. The computer system as in claim 13, wherein said first orientation is an orientation of normal operation of the computer when typing on the keyboard, and said second orientation is an orientation beyond that of normal operation of the computer when typing on the keyboard.

17. The computer system as in claim 14, wherein said first orientation is an orientation of normal operation of the computer when the cover is unfolded from the computer, and said second orientation is an orientation beyond that of normal operation of the computer when the cover is unfolded.

18. The computer system as in claim 11, wherein the device orientation sensor senses an angle between the display screen and the auxiliary device.

19. The computer system as in claim 11, wherein the device orientation sensor includes a switch that senses when an angle between display screen and the auxiliary device exceeds a specified amount.

20. The computer system as in claim 11, wherein the device orientation sensor includes a wireless transmitter that transmits information indicative of the orientation to the computer.

21. A method of operating a portable computer comprising:
using a computing device to produce output to be displayed on a display screen;
pivotally attaching an auxiliary device to the display screen;
determining an orientation between the auxiliary device and the display screen, and producing a signal indicative of said orientation and coupling said signal to said computing device,
detecting a first orientation between said computing device and said auxiliary device where said first angle is an angle which would normally exist between said computing device and said auxiliary device when said auxiliary device was being used by a user to enter data onto the computing device, and locking an orientation that is displayed on the display screen to a locked orientation based on detecting said first orientation between said computing device and said auxiliary device; and
detecting a second orientation between said computing device and said auxiliary device, where said first angle is an angle which would normally exist between said computing device and said auxiliary device when said auxiliary device was being used by a user to enter data onto the computing device, and unlocking the orientation that is displayed on the display screen to an unlocked orientation based on detecting said second orientation.

22. The method as in claim 21, wherein in said locked orientation, a display on said display screen is locked against rotation.

23. The method as in claim 21, wherein said auxiliary device is a keyboard.

24. The method as in claim 21, wherein said auxiliary device is a cover for the display.

25. The method as in claim 21, wherein said first orientation is an orientation of normal operation of said computer when using said auxiliary device, and said second orientation is an orientation beyond that a range of normal operation of the computer.

26. The method as in claim 23, wherein said first orientation is an orientation of normal operation of the computer when typing on the keyboard, and said second orientation is an orientation beyond that of normal operation of the computer typing on the keyboard.

27. The method as in claim 24, wherein said first orientation is an orientation of normal operation of the computer when the cover is unfolded from the computer, and said second orientation is an orientation beyond that of normal operation of the computer when the cover is unfolded.

28. The method as in claim 21, wherein the detecting, detects an angle between the display screen and the auxiliary device.

29. The method as in claim 21, wherein the detecting uses a switch that senses when an angle between display screen and the auxiliary device exceeds a specified amount.

30. The method as in claim 21, wherein the detecting uses a wireless transmitter that transmits information indicative of the orientation to the computer.

* * * * *